3,526,530
             SILICEOUS COATINGS
Robert H. Sams, Aldan, and Robert W. Linton, Springfield, Pa., assignors to Philadelphia Quartz Company, Philadelphia, Pa., a corporation of Pennsylvania
    No Drawing. Filed Apr. 12, 1967, Ser. No. 630,205
                 Int. Cl. B44d 1/44
U.S. Cl. 117—62                                6 Claims

ABSTRACT OF THE DISCLOSURE

A method for coating an unactivated surface with a siliceous film without first activating the surface, which comprises contacting the unactivated surface with an aqueous solution of an alkali metal silicate so as to thereby form a film upon said unactivated surface, completely destabilizing said film of alkali metal silicate solution that surrounds said surface, draining residual liquid from said surface and washing same, and recovering a surface having a permanent, insoluble siliceous film.

PRIOR ART

The literature abounds with references to the coating of metal, ceramic and organic surfaces with siliceous films for use in improving the surface as a base for various binders as well as for the production of nonreflective or opaque surface coatings. The preparation of such films in the wet way has usually required the addition of a setting agent to cause the silica to separate, often as a metallic silicate. Variations in the properties of the coating have been obtained by forming a protocoacervate solution through the addition of a carefully regulated incorporation of coacervating agent below an amount which will cause separation of the silica, and using an activated surface as the setting agent. The silica also may be caused to separate from silica sols and lithium silicate solutions of carefully regulated ratio by merely heating for a sufficient time a sufficiently high temperature.

There has been a need for a more economical and simple means of providing such siliceous coats without the extreme care previously required to obtain uniform coatings over extended surfaces. The prior art procedures have usually required drying of the coating before it is washed free of residual salts, leaving the insoluble siliceous film bound to the surface.

We have now been able to form uniform insoluble siliceous films on surfaces which are wetted or coated by alkali metal solutions by very simple procedures. In our process we use an alkali metal silicate solution destabilized by the addition of a coacervating agent. We may first add a small proportion of the coacervating agent to form a protocoacervate. Such a system may be used to form an insoluble siliceous film by completing the destabilization of the silica by adding coacervating agent to the protocoacervate solution and by heating the protocoacervate sufficiently, e.g. by heating the protocoacervate to temperatures such as about 85° and, preferably nearer 95° C. for a sufficiently long time as, for instance, 10 or 15 hours. No evaporation or drying is required. After such treatment the article is merely washed or scrubbed and the insoluble film will be found to be tightly adhered to the surface. The film may be subsequently dried and washed, as desired.

On the other hand, a film of the alkali metal silicate may be applied to the wettable surface and then further treated by dipping or otherwise contacting the film of alkali metal silicate with a strong coacervating solution, such as a nearly saturated solution of sodium chloride or soluble ketones such as acetone. Such strong coacervating agents will destabilize the silica at the surface and leave an insoluble siliceous coating without drying. This may be washed and scrubbed leaving the insoluble film.

Variations of these procedures may be used as, for instance, a combination of the coacervating agent and heat, but an advantage of the method by which destabilization is accomplished using a coacervating agent only is that it avoids the long heating which is required for destabilization by increasing the temperature. Other additives may be included in the film such as surfactants to aid wetting and lyophillic gums or starches or hydroxylated carbohydrates such as glycerin or sugar which may affect the consistency without destroying the film forming character of the silicate solution.

A wide variety of substrates such as extensive surfaces, e.g. glass plates, or fibers or particles, may be coated by this process. For instance, the fibers or particles may be dispersed in a solution of alkali metal silicate solution and then a coacervating agent may be added to the overall mixture until the coacervation occurs, after which the surfaces may be freed from the coacervate and washed, leaving the insoluble siliceous film on the surface. On the other hand, a protocoacervate solution containing the suspension of fibers or particles may be heated to approximately 95° for several hours, such as 10 to 16 hours, and then washed free of soluble residue. A similar procedure is to coat the finely divided surfaces with a silicate film and then to pass them through either a bath of a coacervating solution or a heated area if coacervating agent is present in the film. The dipping procedure is more economical in the use of reagents.

The formation of a protocacervate in an alkali metal solution is carried out by the addition of a coacervating agent, such as a water soluble organic solvent or a highly soluble inorganic salt, up to a point of incipient coacervation which is indicated by the first appearance of a gaint opalescence in the mixture. Coacervation of silicate solution is discussed in Pat. No. 3,301,701 and this patent is hereby incorporated by reference. When destabilization is obtained by heating a protocoacervate, the solution should contain from about 1 to 15% of $SiO_2$. We have used commercial sodium, potassium, and lithium silicate to form the surface films of our invention. The ratio may vary from about 2 $SiO_2$ to 1 alkali metal oxide to about 4 $SiO_2$ to 1 alkali metal oxide when the alkali metal oxide is soda. With potassium or lithium silicates, the upper ratio may be considerably higher and the lower ratio should be above about 2 $SiO_2$ to 1 alkali metal oxide.

When destabilization is accomplished by treating the surface film with a strong coacervating agent, the film formation can be carried out very rapidly. The silica content should be from about 1 to 15% of $SiO_2$ and the ratios should be limited as described above. The time of reaction with a strong cocervating solution may be very short, that is the order of 0.5 to 2 minutes.

Our new procedure for forming insoluble siliceous films from alkali metal silicate coatings does not require a setting agent or an activated surface. The film forms directly when proper concentration and ratio conditions are met, and the reaction can be carried out very rapidly with the formation of a uniform film which cannot easily be removed by abrasion.

UTILITY

Surface films formed according to this invention have a wide variety of applications. They may be used to reduce light reflection without reducing or, indeed, may in this way increase light transmittance of glass. They may be used to make the glass surface opaque, or merely to flatten glossiness. The surface porosity of wood, ceramics or metal, etc. may be reduced or even sealed and corrosion or tarnish resistance and the scratch resistance of metals may be increased. Adhesives and decorative films may be more strongly bonded to such surfaces. Slip-resistance and printability may be increased and the surfaces may be used for chromatographic development. Low reflective coatings on glass are useful on automobile windshields and headlights. Plate glass and flat glass for windows and picture frames may also be made non-reflective. Television screens and lenses and other optical equipment may be treated by these processes to reduce reflection and to increase transmission. Nonconductive films for electrical applications are prepared in this way either on glass or metal, as desired. Films on metal also increase resistance to scratching, change the surface color and affect other surface characteristics. Fiber glass may be delustered and its resistance to raveling may be increased by mechanical interlocking. Stronger resin attachment to the fiber matrix may be developed for the manufacture of glass fiber reinforced plastics. Color affinity to the glass or metal surface may be increased.

TEST METHODS

In the following examples, which are illustrative only and do not limit the invention, we used in a number of cases glass microslides No. 7036-A from Arthur H. Thomas Co. as test surfaces. After the specified treatment the slides were removed and scrubbed with a bristle brush in warm water and wiped dry. Similar treatment was given to other surfaces coated by the methods of this invention.

In other cases slides were immersed in a container of the solution and the container was then placed in an oil bath at 95° C. for 16 hours. After this exposure the slides were removed, scrubbed and dried, as before. The treated slides were compared with untreated slides for percent of transmitted light using a Brice-Phoenix light scattering photometer Model 25, and the percent reflected light using a Gardner Portable 60° Glossmeter also relative to an untreated glass slide.

The slip resistance of treated versus untreated glass slides was tested. Thus an untreated slide was allowed to rest on another untreated slide fastened to a tilting board, and the angle at which slipping occurred was noted. The same procedure was used for pairs of treated slides.

Adhesion of a pressure-sensitive vinyl tape was determined by pressing the tape against a surface area of ¾ of a square inch. The force necessary to separate the tape from untreated glass compared to treated glass was determined using a standard Chatillon push-pull gauge to measure the force required for separation, as described in "Routine Control Method RC-267" of the Technical Association of the Pulp and Paper Industry.

In other tests, glass rods were inserted in a test tube holding the treating solution and a layer of mineral oil placed on the top. The test tube was then lowered into an oil bath at 95° C. for the necessary time and, on removal, the glass rod was scrubbed and dried and examined for film formation.

EXAMPLE 1

In this example a base solution containing 17.2% of $SiO_2$ was prepared by mixing 60 parts by weight of N sodium silicate, sold by the Philadelphia Quartz Co., which is characterized by having a weight ratio of 3.22 $SiO_2$ to 1 $Na_2O$ and contains 28.7% of $SiO_2$ with 33.95 parts by weight of distilled water and 6.05 parts by weight of sodium chloride crystals. This mixture, designated as A, contained about 17.2% $SiO_2$ and 6.05% NaCl. Some of this solution was diluted using 14.6 parts by weight of A to 85.4 parts by weight of distilled water. The resulting mixture, called solution B, had a concentration of about 0.8% of NaCl and 2.5% of $SiO_2$.

The test tubes referred to above were partly filled with these solutions A and B. A clean glass rod was inserted and the solution covered with a coating of mineral oil. These tube assemblies were lowered into an oil bath at 95° C. and taken out after about 16 hours, after which (as described above) the rods were cooled, scrubbed and dried and examined by reflective light for the development of a coating. In the solution A the silica was not sufficiently destabilized, although a little floc formed in the solution. No coating appeared on the rod. With solution B, however, there was a transparent, smooth, yellow finish, even though there was less floc in the solution itself.

When solution B has aged for about two weeks, a test was rerun and a smooth, transparent light violet coating was obtained. For purposes of comparison, it was noted that such a coating did not form if the rod was left standing in solution B for one day at room temperature. However, higher temperatures could be used, and when sealed in a bomb and held at 165° C. for 16 hours the solution was hazy with floc and the rod acquired a transparent light-refractive film while the Pyrex glass tube holding the solution developed a uniform frosted appearance.

A new solution B was prepared and a square of window glass 4 x 4 inches was treated at 95° C. for one day, after which it was cleaned and scrubbed and found to have a uniform transparent finish which was bluish in reflected light.

A glass rod treated at the same time contained a transparent violet finish, and a glass microslide also had a transparent violet finish which was faintly striated. This slide, when compared to an untreated slide, had a slip resistance (measured as the angle of tilt before slipping on a duplicate slide) of 23° compared to 15° for the untreated slide. The force of bonding to pressure-sensitive tape was 5.6 lbs. compared to 4.5 lbs. for the untreated slide, and the light reflection was only 79 compared to 100 for the untreated slide. Light transmission was 101 compared to 100 for the untreated slide.

In the same solution a steel strip was treated. The surface had a brownish appearance after scrubbing and rinsing. This treated steel strip was placed in a solution of hydrochloric acid made up by diluting 1 part of concentrated HCl with 9 parts of distilled water. An untreated steel slip was also placed in the HCl solution, and after 50 minutes the strips were removed. The untreated strip after washing and drying was darkly tarnished while the treated strip was obviously less attacked. An attempt to coat a piece of gold foil showed no change in appearance and there was no evidence of film formation.

Example 2

In this example a solution of the N sodium silicate was diluted to 2.5% $SiO_2$ with distilled water, and designated solution C. Glass microslides were inserted in this solution and the solution was stirred as granular sodium chloride was sifted in as rapidly as it would dissolve. After the addition of 10 grams of sodium chloride a slide was removed, scrubbed and dried and found to have no apparent finish. After the addition of 30 parts by weight of sodium chloride the solution had become opaquely white and fluocculent; that is, it had begun to coacervate, and a slide removed at this time after scrubbing and drying was found to retain a transparent, bluish finish.

If a less dilute solution was used as, for instance, one with 17.4 parts by weight of the N sodium silicate and 82.6 parts by weight of water, that is approximately 5.0% $SiO_2$, a finish began to appear on the slides after 20 parts of sodium chloride had been added to the solution.

Example 3

A solution D was prepared containing 25% sodium chloride. (This is practically a saturated solution of sodium chloride at room temperature). A clean microslide was then dipped into the diluted sodium silicate solution C of Example 2. When removed, a thin film of the diluted sodium silicate adhered to it. This coated slide was then dipped into the sodium chloride solution D for one minute. After cleaning, scrubbing and drying, it was found to have a uniform, transparent film which was brownish in reflected light. If the cycle was repeated several times, the film remained transparent but became more yellow in reflected light indicating increasing film thickness with repeated treatment. If the solution C was aged, the final film formed on the glass slide by this procedure was good, but of somewhat different color.

If the silicate solution is too concentrated, the silica cannot be satisfactorily destabilized. For instance, when a slide was dipped in 100% N sodium silicate, that is 28.7% $SiO_2$ solution of sodium silicate, and then dipped for one minute in solution D, no finish was retained. However, other coacervating agents can be used, and a slide which had been dipped in solution C and was then dipped in methanol for one minute retained a transparent, brownish coating.

However, a solution containing about 14% of $SiO_2$ formed a film on the glass slide which, after treating with solution D for one minute left a transparent finish on the glass slide. With methanol, however, the silica concentration appeared to be too great and a white crust formed on the surface without forming a permanent finish. The permanent transparent finish was not always formed even in solution D when the original filming solution was as concentrated as 14% $SiO_2$. However, with a dipping solution containing 5% of $SiO_2$, solution D formed a uniform transparent, brownish finish after one minute, and methanol formed a somewhat erratic finish. With 10% silica in the original film, treatment for 5 minutes in solution D left a transparent brownish film which was darker than when the solution contained 5% of silica. Approximately the same finish was obtained whether the silica film was dipped in solution D for a half minute or two minutes.

When dextrin was added to a solution of 10% silica, longer times of exposure to solution D were required in order to permit the salt to penetrate and react. Aluminum foil, when dipped in a 10% silica solution of sodium silicate and then into solution D for a half minute, retained a finish and showed a slightly increased weight. An iron rod similarly treated also retained a surface film after washing and scrubbing.

Example 4

In this example solutions of lithium silicate were used instead of sodium silicate. A slide was dipped into a dilute solution of the lithium silicate having a ratio of 1 $Li_2O$ to 2 $SiO_2$ and a silica concentration of 12.5% $SiO_2$ and then dipped in a solution of 25% sodium chloride for 30 seconds. No finish was obtained. Nor was a finish obtained using a more dilute 1 $Li_2O$ to 2 $SiO_2$ solution of 6.2% $SiO_2$ concentration and then dipping for 30 seconds in the salt solution.

However, a solution of 1 $Li_2O$:5 $SiO_2$ at 21.4% $SiO_2$ was diluted to about 5% of $SiO_2$ and a uniform transparent finish was obtained on a glass slide which was first dipped into the lithium silicate solution and then for 30 seconds in the saturated solution of salt. However, if the undiluted lithium silicate at 21.4% of $SiO_2$ was used as the first dip, no finish was obtained, but a finish began to be formed when the first dipping solution contained 15% of $SiO_2$.

Example 5

The following comparative tests indicate a system for coating fibers or particles, such as glass fibers, clay, titanium dioxide, aluminum powder or other finely divided powders with silica through our process of destabilizing the silica by addition of coacervating agents.

As a preliminary test in order to show that the system was capable of destabilizing silica, a solution of 5 parts by weight of the N sodium silicate was dispersed in 82.6 parts by weight of water and a broken piece of No. 7036-A glass microslide was immersed in the solution. The silica content was increased by adding 12.4 additional parts by weight of the N sodium silicate and, finally, 20 parts by weight of crystalline sodium chloride was sifted in with continuous stirring. This thickened the solution which was then thinned with water and washed with a total additional 500 parts by weight of water into a larger container. The glass was removed, washed and dried and found to have retained a finish.

Similarly, a solution of 5 parts by weight of the N sodium silicate was dispersed in 82.6 parts by weight of water and 5 parts by weight of Barden kaolin clay (an air separated clay sold by J. M. Huber Corp.) was stirred in. This was agitated vigorously with a high speed mixer for one minute and then 12.4 parts by weight of the N sodium silicate were added and the batch was stirred further. A fragment of a glass microslide was added to the mixture and the dispersion was washed into a larger container with a total of 500 additional parts of water. After further strong agitation for one minute, the clay was filtered off through No. 40 Whatman filter paper. The damp, drained filter cake was then slurried in 500 parts by weight of distilled water with further stirring and strong agitation with the high speed mixer and the pH adjusted to 5.3 with dilute $H_2SO_4$. The glass slide fragment taken from this batch was washed and dried and had no apparent finish.

On the other hand, a similar mixture was prepared with 5 parts by weight of N sodium silicate and 82.6 parts by weight of water and 5 parts by weight of the Barden clay were stirred in with the same vigorous agitation, after which fragments of glass microslides were added to the mixture and the batch stirred during the addition of 12.4 parts by weight of N sodium silicate. After thorough mixing, 20 parts by weight of crystalline sodium chloride was sifted in with continuous agitation. The batch was then diluted and washed into another container with 500 parts by weight of distilled water and was strongly agitated with the high speed mixer for another minute. A slide fragment removed after this treatment was washed and dried and was shown to retain a finish.

The batch was then filtered through No. 40 Whatman filter paper and the damp, drained cake was reslurried with 500 parts by weight of distilled water with stirring and agitation and acidified to a pH of 5.4 with dilute sulfuric acid. A further slide was removed at this time and washed and dried and found to retain a finish.

Batch No. 1 was that treated without the addition of salt, and Batch No. 2 had been treated with salt to destabilize the silica and form a coating on the clay particles. Each filter cake was redispersed in water by shaking and left to stand for about 3 hours. Each batch was then suction filtered through No. 40 Whatman filter paper and the damp, drained cake placed on aluminum foil and set in an oven at 110° C. After drying for about a day, the cakes were removed from the oven, pulverized gently by pressing with a spatula, and the powders were then compared. The No. 2 powder, which had been treated with sodium chloride, was more nearly white and free flowing and had a bulk of 1.99 ml. per gram, whereas the powder which had not been treated with sodium chloride had a bulk of 1.36 ml. per gram. Barden clay was intermediate between the treated and untreated clays in both bulk and color. The treated clay was also more freely flowing than either the original clay or the clay which had been treated with soluble silicate but no salt.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What is claimed is:

1. A method for coating a non-reactive surface with a siliceous film without first activating the surface, which comprises:
   (a) contacting the unactivated surface with an aqueous solution of sodium silicate having a concentration of 2 to 15% of $SiO_2$ and a $SiO_2:Na_2O$ ratio of about 2:1 and 4:1, so as to thereby form a film of said aqueous solution upon said non-reactive surface,
   (b) completely destabilizing comprising coacervating said film of sodium silicate solution that surrounds said surface,
   (c) draining residual liquid from said surface and washing same, and
   (d) recovering a surface having a permanent, insoluble film.

2. The process of claim 1 in which the sodium silicate solution is a protocoacervate.

3. The process of claim 2 in which the protocoacervate film is completely destabilized by heating.

4. The process of claim 1 in which the sodium silicate film is completely destabilized with a strong coacervating agent.

5. Tht process of claim 4 in which the coacervating agent is sodium chloride.

6. The process of claim 4 in which the coacervating agent is an alcohol.

References Cited
UNITED STATES PATENTS 3,301,701    1/1967    Baker et al.

ALFRED L. LEAVITT, Primary Examiner

J. A. BELL, Assistant Examiner

U.S. Cl. X.R.

117—70, 169